(12) United States Patent
Tanaka et al.

(10) Patent No.: US 9,539,729 B2
(45) Date of Patent: Jan. 10, 2017

(54) CONVEYING APPARATUS

(71) Applicant: KABUSHIKI KAISHA TOSHIBA, Minato-ku, Tokyo (JP)

(72) Inventors: Junya Tanaka, Tokyo (JP); Hiroaki Nakamura, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 14/724,906

(22) Filed: May 29, 2015

(65) Prior Publication Data
US 2015/0343645 A1 Dec. 3, 2015

(30) Foreign Application Priority Data
May 30, 2014 (JP) ................................. 2014-113030

(51) Int. Cl.
*B65G 47/90* (2006.01)
*B25J 15/00* (2006.01)
*B25J 13/08* (2006.01)

(52) U.S. Cl.
CPC ........... *B25J 15/0014* (2013.01); *B25J 13/081* (2013.01); *B65G 47/90* (2013.01)

(58) Field of Classification Search
CPC ..... B25J 15/0014; B25J 15/0616; B25J 19/02; B25J 13/081; B25J 11/0045; B65G 47/90; B65G 47/901; B65G 47/91; B65G 47/912
USPC ................................................ 294/86.4, 185
See application file for complete search history.

(56) References Cited

U.S. PATENT DOCUMENTS

| | | | | |
|---|---|---|---|---|
| 4,746,255 A | * | 5/1988 | Roccabianca | .......... B65G 61/00 294/67.33 |
| 7,004,524 B2 | * | 2/2006 | Marshall | ................... B25B 9/00 294/86.4 |
| 8,628,131 B2 | * | 1/2014 | Lang | ................... A22C 17/0093 294/197 |

(Continued)

FOREIGN PATENT DOCUMENTS

DE 10 2013 015 000 A1 * 3/2015
JP 2007-222153 9/2007

(Continued)

OTHER PUBLICATIONS

Kitajima et al., "Mobile Inspection Robot MOIRA with 4 Sides Crawlers for Rescue Activity," JSME Conference on Robotics and Mechatronics (2003), cover page and pp. 1P1-2F-B4(1)-1P1-2F-B4(2).

*Primary Examiner* — Dean Kramer
(74) *Attorney, Agent, or Firm* — Finnegan, Henderson, Farabow, Garrett & Dunner, LLP

(57) ABSTRACT

According to one embodiment, a conveying apparatus includes a finger unit, a drive belt, a first belt and a transfer belt. The finger unit includes first and second rotation units, and a projecting tip. The drive belt includes one end fixed to the finger unit and moves the finger unit in a movement direction. The first belt is provided on a first surface of the drive belt and includes one end folded at the first rotation unit to be away from the first surface and fixed to a first support unit. The second belt is provided on a second surface of the drive belt opposed to the first surface and includes one end folded at the second rotation unit to be away from the second first surface and fixed to the first support unit.

9 Claims, 13 Drawing Sheets

(56) References Cited

U.S. PATENT DOCUMENTS

| | | | | |
|---|---|---|---|---|
| 8,733,810 B2 * | 5/2014 | Oda | ............... | B25J 15/083 |
| | | | | 294/86.4 |
| 8,967,688 B2 * | 3/2015 | Wilson | ............... | E01H 1/1206 |
| | | | | 294/1.3 |
| 2004/0232716 A1 * | 11/2004 | Reed | ............... | B25J 15/00 |
| | | | | 294/86.4 |
| 2010/0187846 A1 * | 7/2010 | Crezee | ............... | B25J 15/0004 |
| | | | | 294/115 |
| 2011/0156416 A1 | 6/2011 | Kawanami et al. | | |
| 2013/0200644 A1 | 8/2013 | Shiomi | | |

FOREIGN PATENT DOCUMENTS

| | | |
|---|---|---|
| JP | 2009-72209 | 4/2009 |
| JP | 2011-131341 | 7/2011 |
| JP | 2013-158888 | 8/2013 |

\* cited by examiner

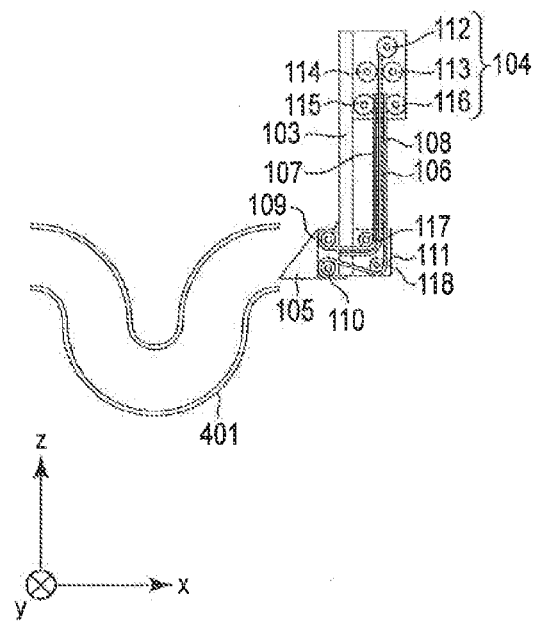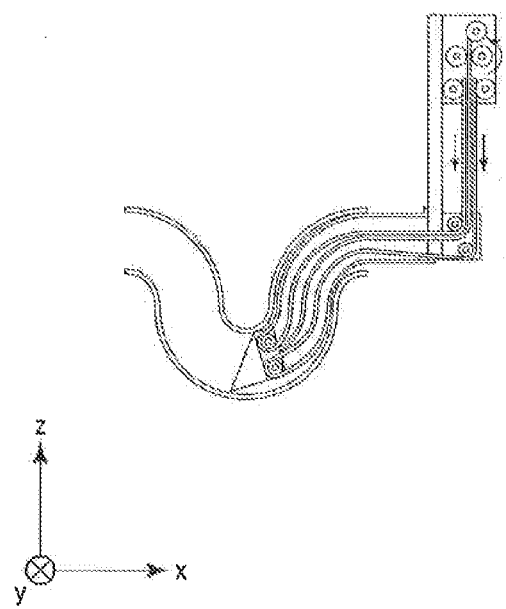
FIG. 4A  FIG. 4B
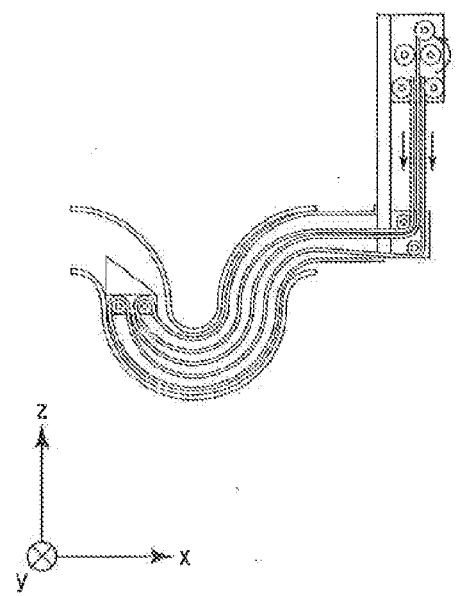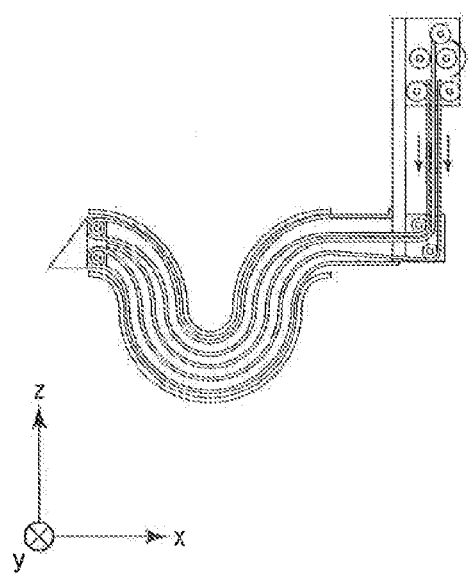
FIG. 4C  FIG. 4D

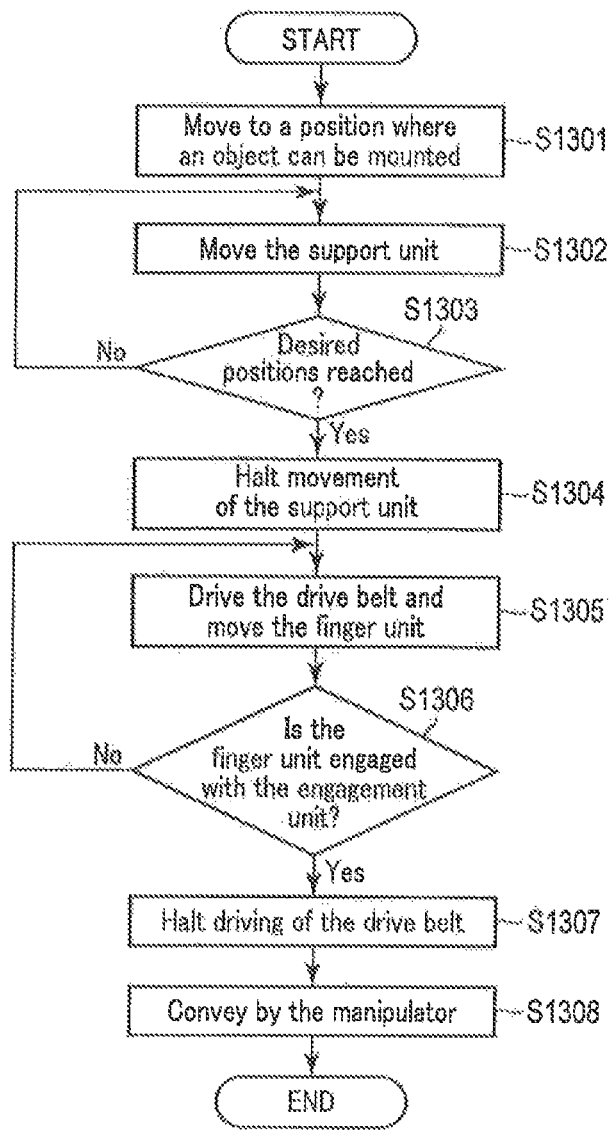
F I G. 13

CONVEYING APPARATUS

CROSS-REFERENCE TO RELATED APPLICATIONS

This application is based upon and claims the benefit of priority from Japanese Patent Application No. 2014-113030, filed May 30, 2014, the entire contents of which are incorporated herein by reference.

FIELD

Embodiments described herein relate generally to a conveying apparatus.

BACKGROUND

When fixed-shaped objects such as a box, and flexible objects such as a food item are lifted and conveyed in an automated production line, the conveying operation is performed by gripping the objects with a gripping mechanism attached to, for example, a machine tool, a multi-jointed manipulator, or an industrial robot.

When flexible objects are gripped, the object's shape is changed by a gripping force. Thus, a technique for making a hand for pinching flexible objects of an elastic material and a technique for transferring flexible objects by rotating a looped transfer belt have been adopted.

BRIEF DESCRIPTION OF THE DRAWINGS

FIGS. 4A to 4D illustrate a first alternative example of the conveying process according to the first embodiment.

FIGS. 5A to 5D illustrate a second alternative example of the conveying process according to the first embodiment.

FIG. 13 is a flowchart illustrating operation control of the conveying apparatus.

DETAILED DESCRIPTION

Figure 1:
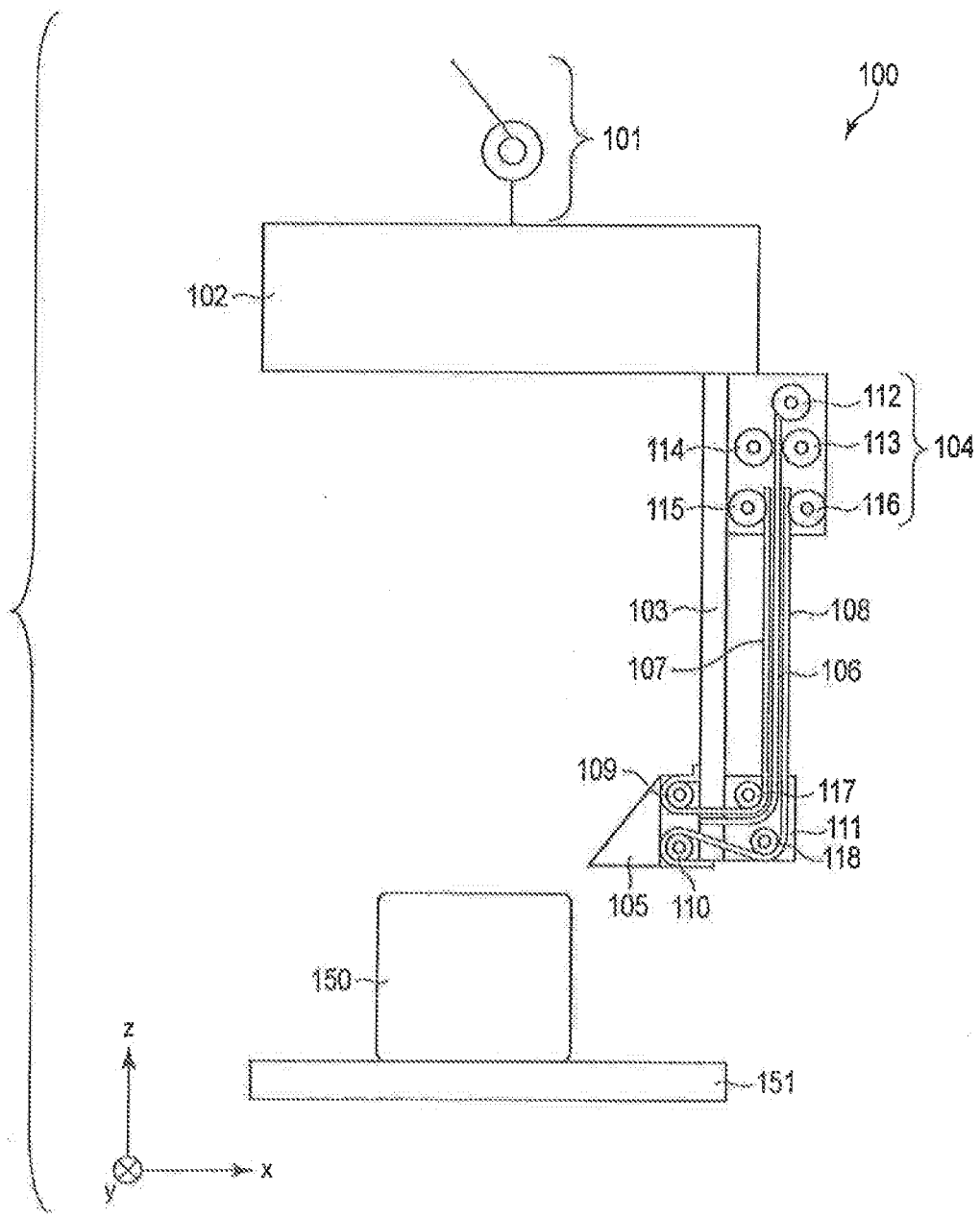
FIG. 1 illustrates a conveying apparatus according to a first embodiment.

Even when a flexible object is gripped by a hand made of an elastic material, the object is deformed. Thus, if the object is one that is ruptured or broken due to a small deformation, such a hand cannot be used. In the case where a flexible object is transferred by rotating a looped transfer belt, when the object is on a high friction surface, such as a carpet, the looped transfer belt is hindered by friction from entering under the object, and transfer of the object is difficult. When a flexible object on a low friction and unstable surface, such as a pile of paper sheets, is transferred, the piled paper sheets inevitably move when the object is transferred, and transfer of the object is difficult.

In general, according to one embodiment, a conveying apparatus includes a first support unit, a finger unit, a drive belt, a first transfer belt and a second transfer belt. The finger unit includes a first rotation unit, a second rotation unit and a projecting tip. The drive belt includes one end fixed to the finger unit and moves the finger unit in a direction of movement. The first transfer belt is provided on a first surface of the drive belt and includes one end folded at the first rotation unit to be away from the second surface and fixed to the first support unit. The second transfer belt is provided on a second surface of the drive belt opposed to the first surface and includes one end folded at the second rotation unit to be away from the second first surface and fixed to the first support unit. The first transfer belt and the second transfer belt move together with the drive belt when the drive belt moves in the direction.

Hereinafter, a conveying apparatus according to one embodiment of the present disclosure will be described in detail with reference to the drawings. In the following embodiments, the elements which perform the same operation will be assigned the same reference numeral, and redundant explanations will be omitted.

(First Embodiment)

A conveying apparatus according to a first embodiment will be described with reference to FIG. 1. FIG. 1 illustrates a case where a conveying apparatus 100 conveys an object 150 to be conveyed that is placed on a mounting board 151.

The object 150 has the property of at least one of flexibility or being difficult to hold, and is called a flexible object. The flexible object includes, for example, a bag of liquid or powder, dough, a fruit, tofu, or konjac food. The flexible object is easily deformed by pressing force and returns to an original form when the pressing force is removed. For example, when the object 150 is gripped on its sides facing each other, the object 150 is deformed, and thus is difficult to be gripped. FIG. 1 shows one object 150. However, there may be a plurality of objects 150.

The conveying apparatus 100 according to the first embodiment includes a manipulator 101, a distance adjuster 102, a first support unit 103, a finger tip extension unit 104, a finger tip unit 105, a drive belt 106, a first transfer belt 107, a second transfer belt 108, a first finger rotation roller 109, a second finger rotation roller 110, and a direction change unit 111.

The finger tip extension unit 104 includes a drive belt winding unit 112, a rotation drive unit 113, a pressing force rotation roller 114, a first transfer belt winding unit 115, and a second transfer belt winding unit 116. The direction change unit 111 includes a first change rotation roller 117 and a second change rotation roller 118.

The finger tip unit 105, the first finger rotation roller 109, and the second finger rotation roller 110 are collectively called a finger unit.

The manipulator 101 includes a plurality of joints (not shown) and can move each unit by rotating or linearly moving the joints.

The distance adjuster 102 is connected to the manipulator 101, and enables the first support unit 103 to move in the x-direction by a linear motion mechanism. The linear motion mechanism may be configured by a combination of a step motor and a ball screw. However, the linear motion mechanism may have any configuration as long as the first support unit 103 is movable.

The first support unit 103 is a vertical member connected to the distance adjuster 102, and is arranged along the z-axis in FIG. 1. The first support unit 103 may be made of any material resistant to cleaning and disinfecting, such as a metal or silicon resin. For cleaning, for example, a combined method of ultrasonic cleaning by immersion into a cleaning liquid and mechanical cleaning by brushing, for example, may be used. Disinfecting may be performed by boiling or chlorine.

The finger tip extension unit 104 is connected to the first support unit and moves the finger tip unit 105 back and forth.

The finger tip unit 105 has a projected forefront, and is connected to the first finger rotation roller 109 and the second finger rotation roller 110. The finger tip unit 105 herein is in a triangular prism form, but may be in a spoon form or a shovel form. The finger tip unit 105 may take any form which can be easily inserted under the object 150 and does not break the object 150.

The drive belt 106 has one end fixed to the finger tip unit 105, and the other end wound about the drive belt winding unit 112. The drive belt 106 is desirably made of a high-strength material such as steel, but may be made of any material.

The first transfer belt 107 is provided in parallel on the upper surface (first surface) of the drive belt 106, and has one end folded back at the first finger rotation roller 109 to be separated from the upper surface of the drive belt 106 and is fixed to the first support unit 103, and the other end is wound about the first transfer belt winding unit 115. The first transfer belt 107 is desirably made of a durable and flexible material including a synthetic resin such as Teflon®, but may be made of any material.

The second transfer belt 108 is provided in parallel on the lower surface (second surface) of the drive belt 106, and has one end folded back at the second finger rotation roller 110 to be separated from the lower surface of the drive belt 106 and is fixed to the first support unit 103, and the other end is wound about the second transfer belt winding unit 116. Like the first transfer belt 107, the second transfer belt 108 is desirably made of a durable and flexible material including a synthetic resin such as Teflon, but may be made of any material. Assumed as herein is the case where the first transfer belt 107 and the second transfer belt 108 are in a planar hand form. However, the first transfer belt 107 and the second transfer belt 108 may be made of a plurality of strings arranged in parallel or in another form as long as the object 150 can be mounted thereon.

The first finger rotation roller 109 is connected to the finger tip unit 105, and rotates as the finger unit moves back and forth. Accordingly, the first transfer belt 107 wound about the first finger rotation roller 109 moves back and forth in the direction of movement of the finger tip unit 108. The direction of movement is a direction in which the finger tip unit 105 moves for moving and mounting (hereinafter referred to as "transferring") the object 150 on the first transfer belt 107. In the case of FIG. 1, the direction of movement is the x-direction.

The second finger rotation roller 110 is connected to the finger tip unit 105, and rotates as the finger unit moves back and forth in the direction of movement. Accordingly, the second transfer belt 108 wound about the second finger rotation roller 110 moves back and forth in the direction of movement of the finger tip unit 105.

When a surface of the first transfer belt 107 contacting the first finger rotation roller 109 is made of a non-friction material, the first finger rotation roller 109 may make no rotation and may be a fulcrum. Similarly, when a surface of the second transfer belt 108 contacting the second finger rotation roller 110 is made of a non-friction material, the second finger rotation roller 110 may make no rotation and may be a fulcrum.

The drive belt winding unit 112 is a roller about which the drive belt 106 is wound, and energizes the drive belt 106 to make torque always work in a direction of rewinding the drive belt 106 by an elastic member such as a spring.

The rotation drive unit 113 rotates to apply torque on the drive belt 106 and moves the drive belt 105 back and forth in the direction of movement.

The pressing force rotation roller 114 is located to be opposed to the rotation drive unit 113 with the drive belt 106 interposed therebetween, and rotates to reduce deflections produced when the drive belt 106 moves in the direction of movement.

The drive belt winding unit 115 is a roller about which the first transfer belt 107 is wound, and energizes the first transfer belt 107 to make torque always work in a direction of rewinding the first transfer belt 107 by an elastic member such as a spring.

The second transfer belt winding unit 116 is a roller about which second transfer belt 108 is wound, and energizes the second transfer belt 108 to make torque always work in a direction of rewinding the second transfer belt 108 by an elastic member such as a spring.

By winding and energizing an end of each of the first transfer belt 107, the drive belt 106, and the second transfer belt 108, the finger tip extension unit 104 can be made smaller.

The first change rotation roller 117 is a roller for changing the direction of the first transfer belt 107 to a desired direction. In FIG. 1, the first change rotation roller 117 diverts the first transfer belt 107 extending in the z-direction from the first transfer belt winding unit 115 to extend in the x-direction.

The second change rotation roller 118 is a roller for changing the direction of the second transfer belt 108 to a desired direction. In FIG. 1, the second change rotation roller 118 diverts the second transfer belt 108 extending in the z-direction from the second transfer belt winding unit 116 to extend in the x-direction.

Figure 2:
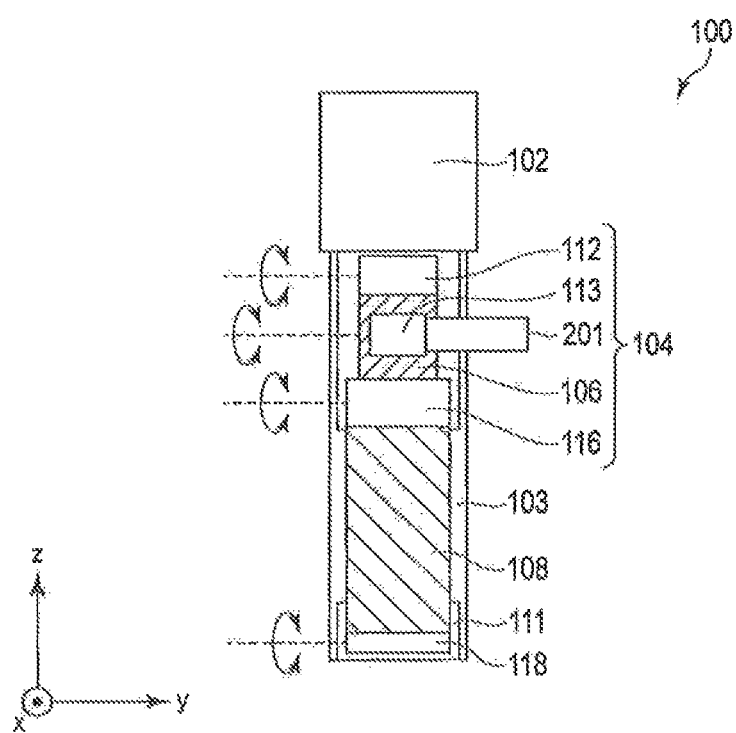
FIG. 2 illustrates a finger extension unit viewed in the x-direction.

Next, the finder tip extension unit 104 will be described with reference to FIG. 2. FIG. 2 illustrates the conveying apparatus 100 viewed in the x-direction, The drive belt winding unit 112, the pressing force rotation roller 114, the first transfer belt winding unit 115, and the second transfer belt winding unit 116 rotate together in accordance with the rotation torque of the rotation drive unit 113. The rotation of the rotation drive unit 113 may be made by, for example, directly connecting a motor 201 and applying torque to the rotation drive unit 113. Alternatively, the rotation drive unit 113 may be indirectly connected to the motor 201 by placing, for example, a belt and a pulley therebetween.

A conveying process of the conveying apparatus 100 according to the first embodiment will be described with reference to FIG. 3.

Figure 3:
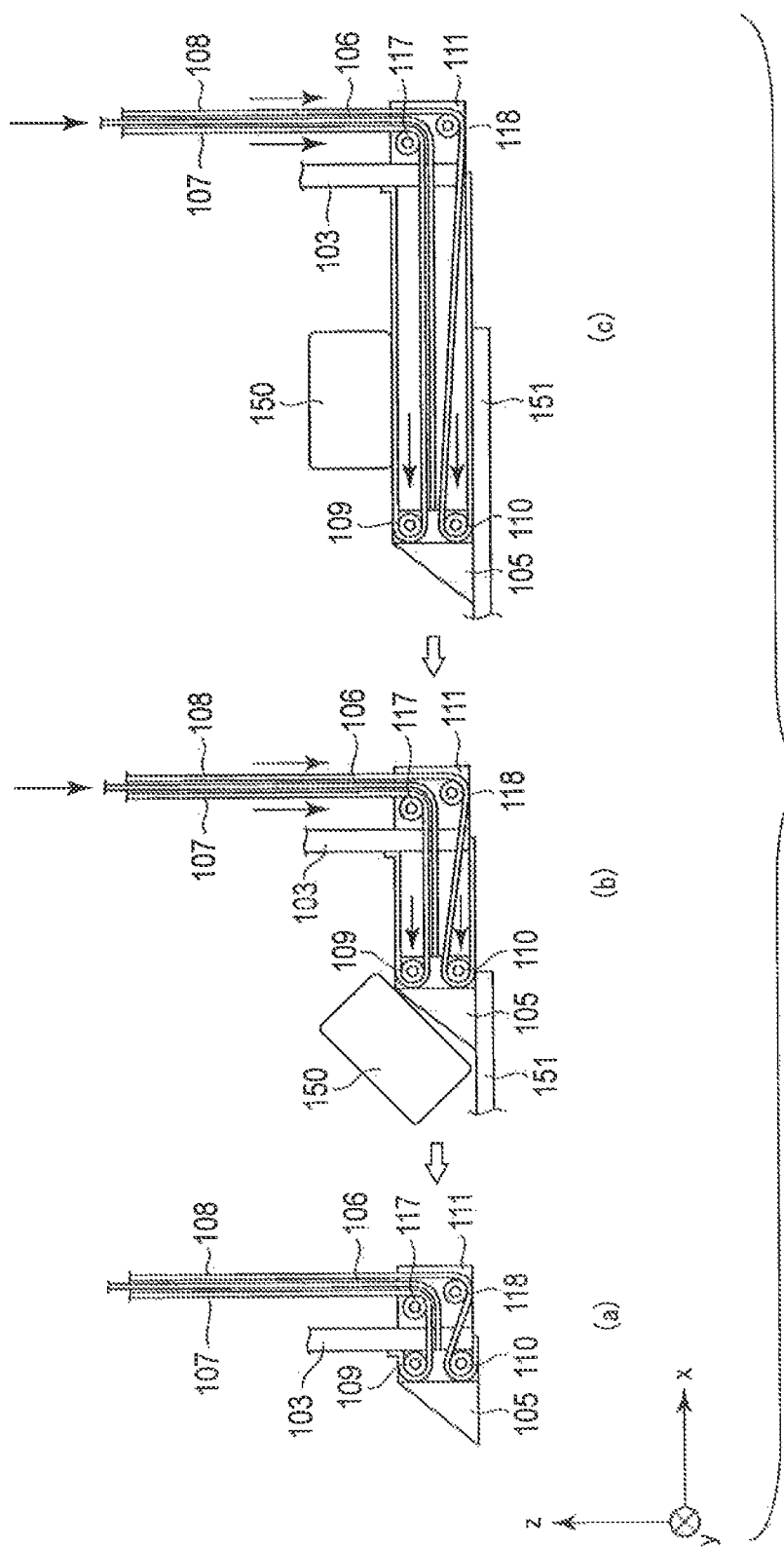
FIG. 3 illustrates a conveying process of the conveying apparatus according to the first embodiment.

As shown in FIG. 3, by the rotation drive unit 113 rotating from the initial state shown in FIG. 3 (a), the drive belt 106 moves in the direction of movement as shown in FIG. 3 (b), and the finger tip unit 105 moves from the first support unit 103 in the direction of movement. In accordance with the movement, the first transfer belt 107 and the second transfer belt 103 also move from the first support unit 103 in the direction of movement. The finger tip unit 105 is inserted between the mounting board 151 and the lower surface of the object 150 in the way of the finger tip unit 105.

As the finger tip unit 105 moves in the direction of movement, the object 150 is transferred onto the first transfer belt 107 as shown in FIG. 3 (c). When the object 150 is transferred onto the first transfer belt 107, the surface of the first transfer belt 107 that comes into contact with the lower surface of the object 150 continuously comes out so as to be wedged under the lower surface of the object 150. Namely, the first transfer belt 107 extends in the direction of movement. Accordingly, transfer can be completed without producing friction with the object 150 and damaging the object 150, although the object 150 is flexible. Similarly, the surface of the second transfer belt 108 that comes into contact with the surface of the mounting board 151 continuously comes out to come into contact with the surface of the object 151. Namely, the second transfer belt 108 extends in the direction of movement. Accordingly, friction with the mounting board 151 is not produced. The finger tip unit 105 smoothly goes under the lower surface of the object 150, and the object 150 can be easily transferred.

The manipulator 101 can convey the object 150 by moving in an x-y planar direction, with the object 150 mounted thereon. When the mass of the object 150 is sufficiently small relative to the bending rigidity of the drive belt 106, the object 150 can be conveyed by moving the manipulator 101 in the z-direction.

Next, another example of the conveying process of the conveying apparatus 100 will be described with reference to FIGS. 4A to 4D.

In FIGS. 4A to 4D, assumed as object 401 is a cylindrical and hollow object such as a crooked pipe. Since the finger unit, the drive belt 106, the first transfer belt 107, and the second transfer belt 208 are flexible to some extent, the finger unit can move forward along the shape of the object 401 by moving forward in the object 401 in the direction of movement. In the case of FIGS. 4A to 4D, the direction of movement is along the central axis of the cylindrical object 401. When the load due to the mass of the object 401 is sufficiently small relative to the bending rigidity of the drive belt 106, the object 401 can be lifted and conveyed by moving the finger unit to the exit of the object 401 as shown in FIG. 4D. When the load due to the mass of the object 401 is large relative to the bending rigidity of the drive belt 106, the object 401 can be conveyed by dragging on the surface contacting the object 401.

Figure 5:
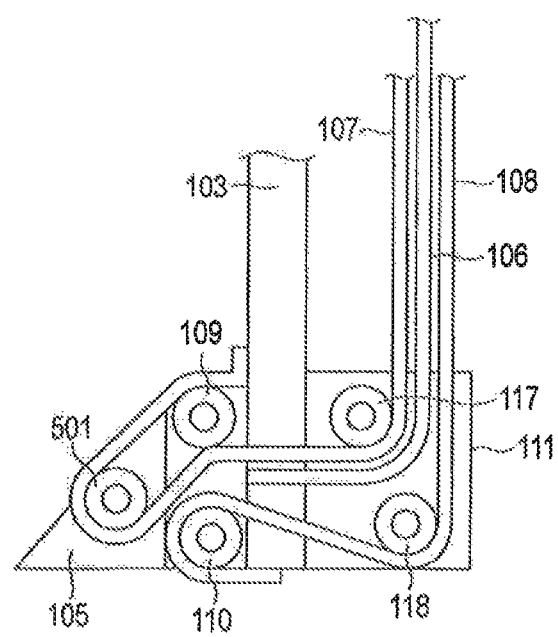
FIG. 5 illustrates a modification of the finger unit.
Figure 6A:
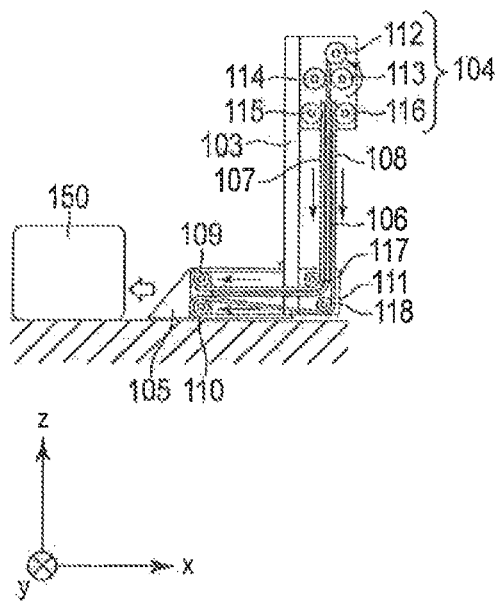
Figure 6B:
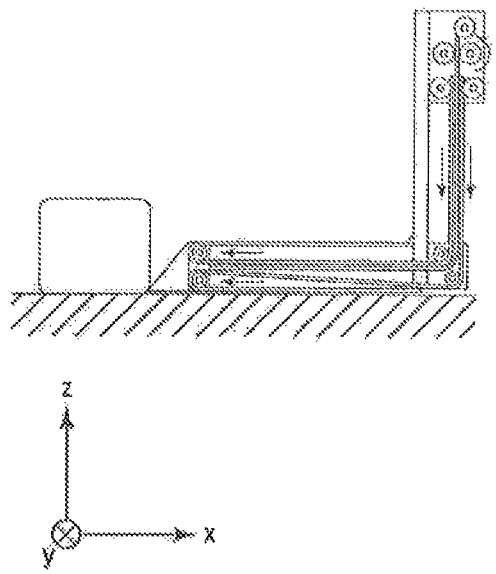
Figure 6C:
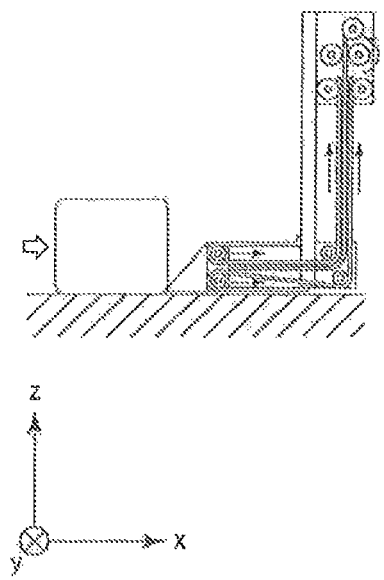
Figure 6D:
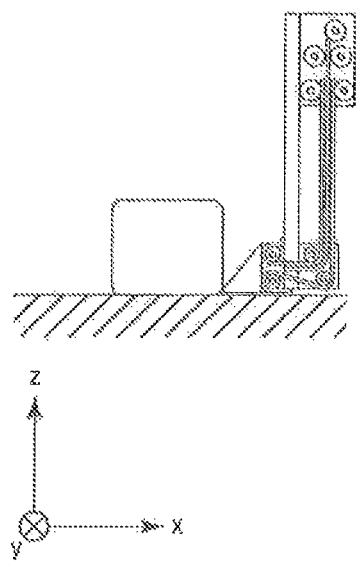

Next, a modification of the finger unit will be described with reference to FIG. 5.

The finger unit includes a surface rotation roller 501. The first transfer belt 107 is folded back at the surface rotation roller 501 and fixed to the first support unit 103 while covering the surface of the finger tip unit 105.

At the surface rotation roller 501, the first transfer belt 107 rotates to transfer the object 150 onto the first transfer belt 107 when the finger tip unit 105 goes under the lower surface of the object 150. Accordingly, the object 150 can be more easily transferred.

Next, a second alternative example of the conveying process of the conveying apparatus 100 will be described with reference to FIGS. 6A to 6D.

FIGS. 6A to 6D show a case where the finger tip unit 105 has a suction mechanism capable of vacuum suction, and conveys the object 150 by suctioning the object 150. When the friction between the object 150 and the floor surface or the mounting board onto which the object 150 is transferred is so small that the friction can be ignored, the object 150 can be conveyed by the finger tin unit 105 moving in a reverse direction of movement while vacuum-suctioning the object 150. The finger tip unit 105 may be provided with one suction mechanism or a plurality of suction mechanisms.

The ends of the drive belt 106, the first transfer belt 107, and the second transfer belt 108 may be linearly energized, instead of being wound and energized. When the first transfer belt winding unit 115 and the second transfer belt winding unit 116 can rotate together in accordance with driving of the rotation drive unit 113, and the rotations of the first transfer belt winding unit 115 and the second transfer belt winding unit 116 can be controlled, the ends of the drive belt 106, the first transfer belt 107, and the second transfer belt 108 need not be energized.

According to the above-described first embodiment, the finger unit is moved by the drive belt, the first transfer belt, and the second transfer belt to be inserted under the object, whereby the object can be transferred onto the first belt and conveyed.

Since one end of the first transfer belt provided in parallel on the upper surface of the drive belt is fixed to the first support unit, a flexible object difficult to hold can be transferred onto the first transfer belt without being broken. Since one end of the second transfer belt provided in parallel on the lower surface of the drive belt is fixed to the first support unit, an object can be smoothly transferred onto the first transfer belt without friction being produced, even when the surface friction of the mounting board on which the object is mounted is high.

By winding and energizing the end of each of the first transfer belt 107, the drive belt 106, and the second transfer belt 108, the size of the finger tip extension unit 104 can be reduced, and the moving distance of the finger tip unit 105 can be increased.

In the first embodiment, the first support unit 103 is a rectangular parallelepiped, but may have an arc-like shape. When the first support unit 103 has an arc-like shape, the finger tip unit 105 may be engaged with an end of the arc, and the object 150 may be gripped by being embraced by the drive belt 106.

(Second Embodiment)

The second embodiment differs from the first embodiment in that the conveying apparatus includes a second support unit opposed to the first support unit, and an engagement unit for engaging the finger unit.

This allows the finger unit to be fixed to the engagement unit, and allows the object to be transferred and conveyed in a more stable state.

The conveying apparatus according to the second embodiment will be described with reference to FIG. 7.

A conveying apparatus 700 according to the second embodiment includes a manipulator 101, a distance adjuster 102, a first support unit 103, a finger tip extension unit 104, a finger tip unit 105, a drive belt 106, a first transfer belt 107, a second transfer belt 108, a first finger rotation roller 109, a second finger rotation roller 110, a direction change unit 111, a second support unit 701, and an engagement unit 702.

The manipulator 101, the first support unit 103, the finger tip extension unit 104, the finger tip unit 105, the drive belt 106, the first transfer belt 107, the second transfer belt 108, the first finger rotation roller 109, the second finger rotation roller 110, and the direction change unit 111 perform the same operations as the ones described in the first embodiment, and explanations thereof are omitted.

The distance adjuster 102 moves the first support unit 103 and the second support unit 701 in the x-direction to adjust the distance between the first support unit 103 and the second support unit 701.

Figure 7:
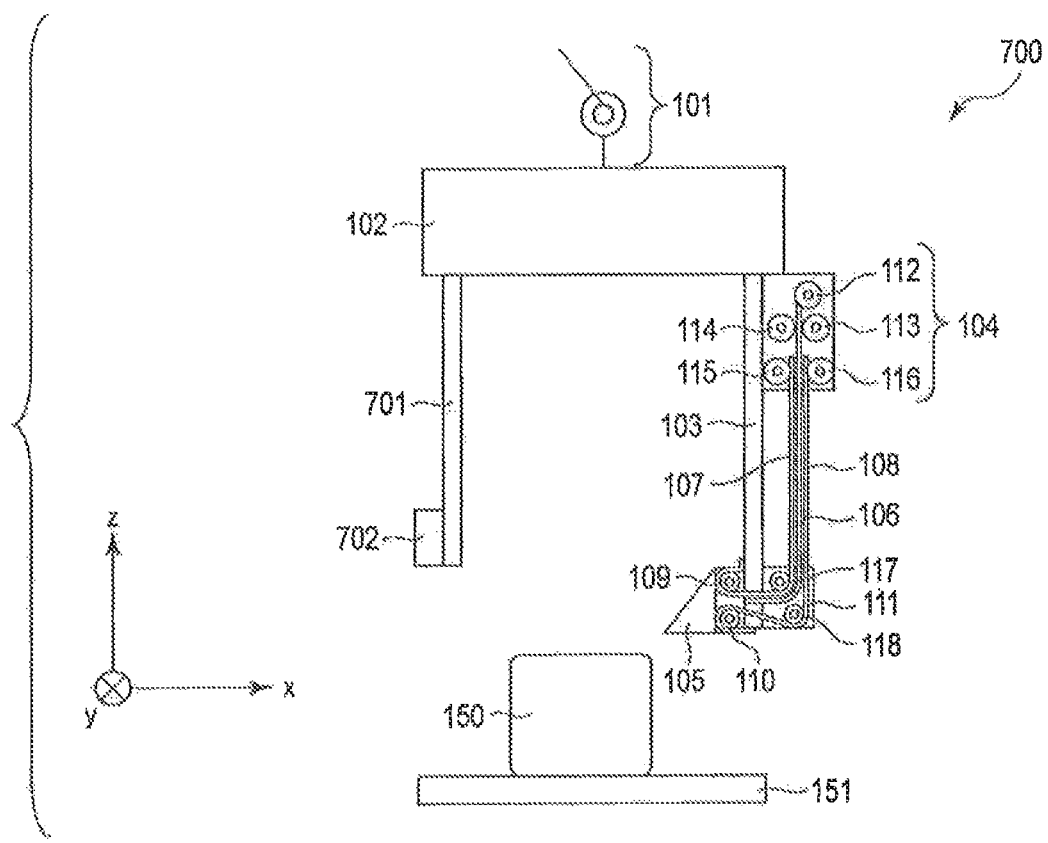
FIG. 7 illustrates a conveying apparatus according to a second embodiment.

The second support unit 701 is similar to the first support unit 103, and is a vertical member parallel to the z-axis in FIG. 7. The second support part 701 may also be made of any material resistant to cleaning and disinfecting. One of the first support unit 103 and the second support unit 701 may be fixed to the distance adjuster 102.

The engagement unit 702 is provided on the second support unit 701, and is connected to the finger tip unit 105. For example, if a part of the finger tip unit 105 is made of iron, magnetic coupling can be achieved by making the engagement unit 702 of an electromagnet, and the engagement unit 702 and the finger tip unit 105 can be fixed to each other. As shown in FIG. 5, when the finger tip unit 105 includes the surface rotation roller 501, the engagement unit 702 and the finger tip unit 105 can achieve magnetic coupling and be fixed to each other with the surface rotation roller 501 interposed therebetween. This configuration can prevent the first transfer belt 107 from rotating during conveyance. In addition, for example, a method for engaging by suctioning the finger tip unit 105 with the suction mechanism of the engagement unit 702 can be also used.

A conveying process of the conveying apparatus 700 according to the second embodiment will be described with reference to FIGS. 8A to 8D. In FIGS. 8A to 8D, a fixed-shaped object, such as a box, is assumed as an object 150.

Figure 8A:
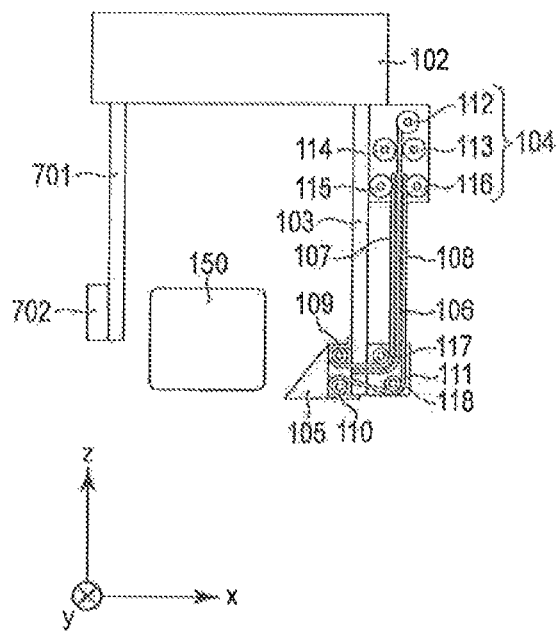
FIGS. 8A to 8D illustrate a conveying process of the conveying apparatus according to the second embodiment.

FIG. 8A illustrates the initial state. The distance between the first support unit 103 and the second support unit 701 may be adjusted by the distance adjuster 102 moving the second support unit 701 toward the object 150 before the finger tip unit 105 moves toward the object 150. The second support unit 701 may come into contact with a side surface of the object 150.

Figure 8B:
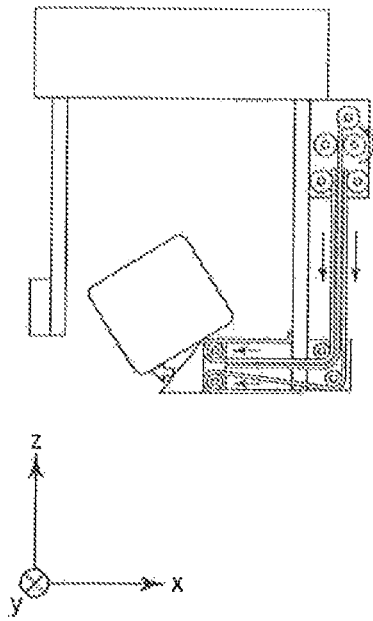
Figure 8C:
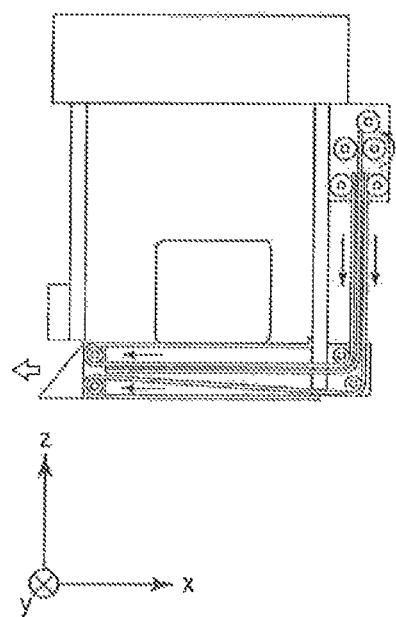

In FIGS. 8B and 8C, the finger tip unit 105 moves in the manner described with reference to FIGS. 3B and 3C, and descriptions of FIGS. 8B and 8C are omitted.

Figure 8D:
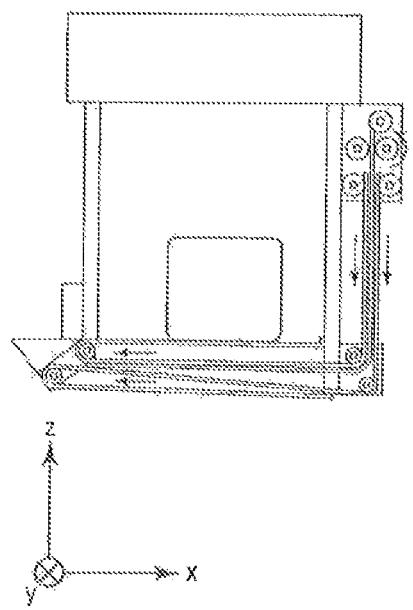
Figure 9A:
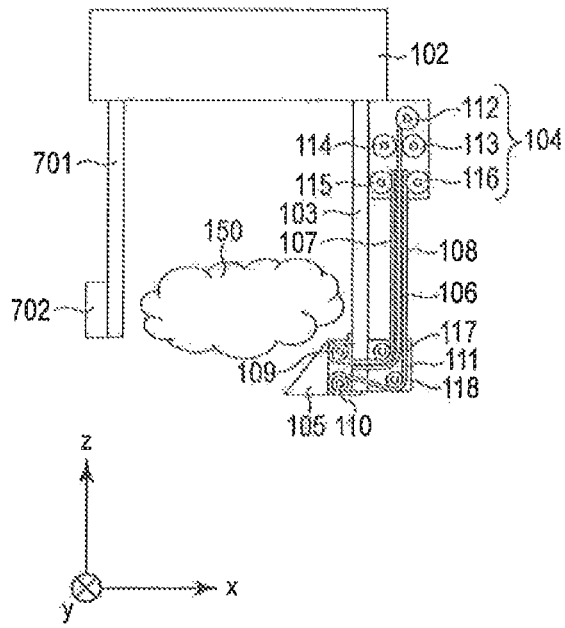
FIGS. 9A to 9D illustrate a first alternative example of the conveying process according to the second embodiment.
Figure 9B:
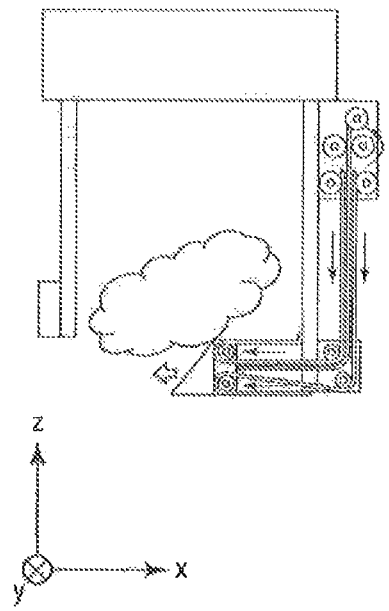
Figure 9C:
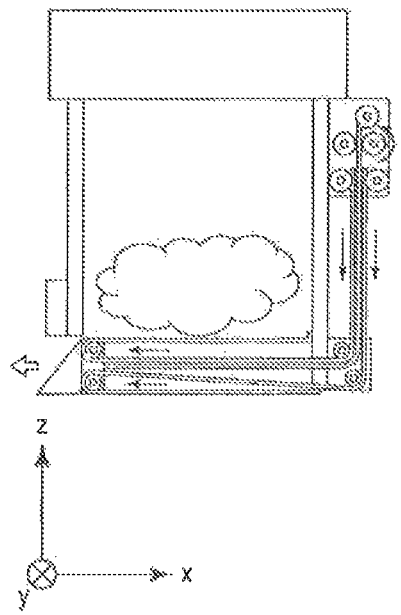
Figure 9D:
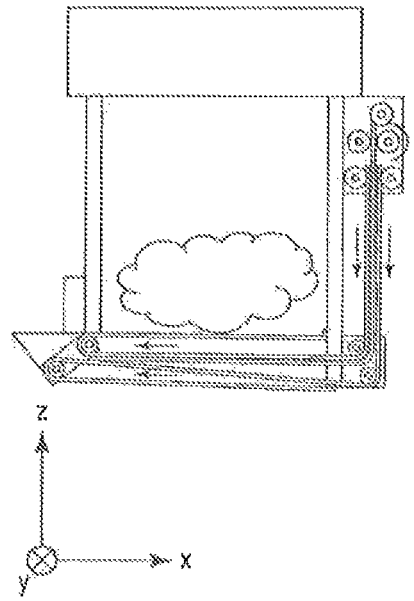

FIG. 8D illustrates a case where the finger tip unit 105 is coupled to the engagement unit 702. Since the finger tip unit 105 is fixed to the second support unit 701, the object 150 can be conveyed in a more stable manner.

Next, a first alternative example of the conveying process of the conveying apparatus 700 will be described with reference to FIGS. 9A to 9D. In FIGS. 9A to 9D, object 150 is assumed as a flexible object that is difficult to hold.

Even when the object 150 is flexible, the object 150 can be conveyed in a more stable manner by transferring the object 150 onto the first transfer belt 107 and fixing the finger tip unit 105 to the second support unit 701 by a process similar to that shown in FIGS. 8A to 8D.

Next, a second alternative example of the conveying process of the conveying apparatus 700 will be described with reference to FIGS. 10A to 10D.

In FIGS. 10A to 10D, assumed is a case where the mounting board 1001 is not planar, but hemispherical, and the object 150 is mounted on the mounting board 1001.

Figure 10A:
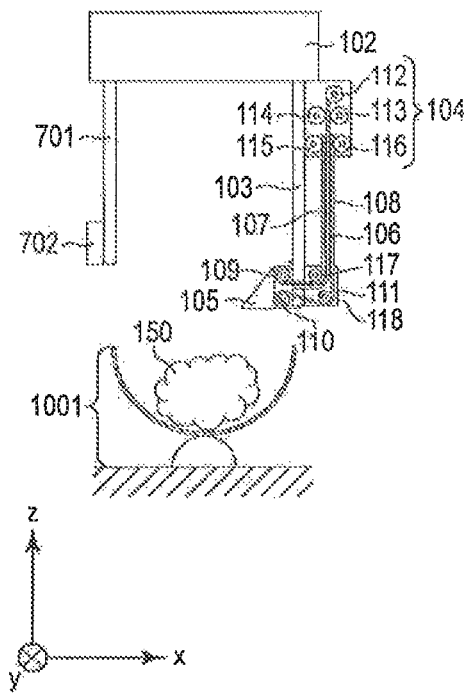
FIGS. 10A to 10D illustrate a second alternative example of the conveying process according to the second embodiment.
Figure 10B:
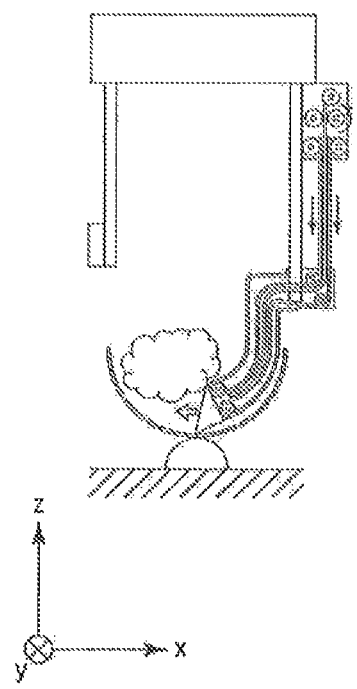
Figure 10C:
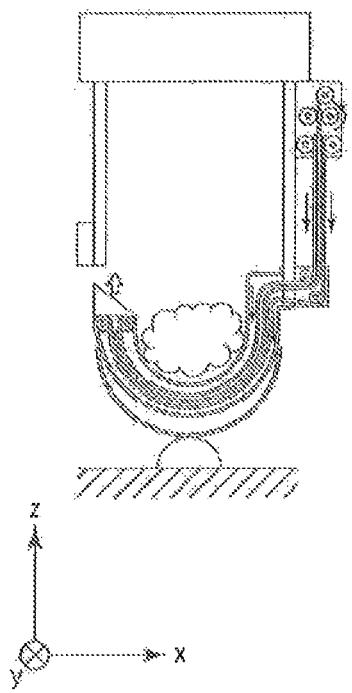
Figure 10D:
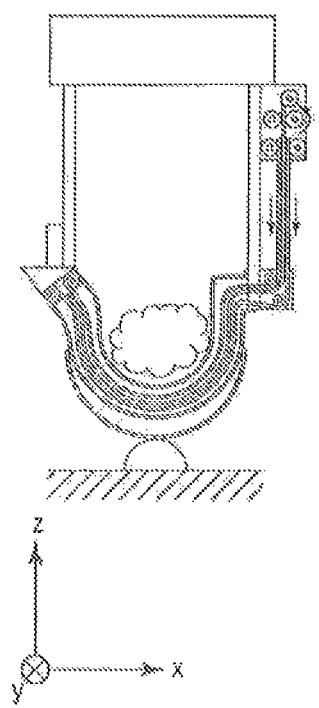

For example, by increasing the mass of the finger tip unit 105, the finger tip unit 105 can move vertically downward in the negative direction of the z-axis). Accordingly, the finger tip unit 105 can be moved along the shape of the mounting board 1001, and the object 150 can be transferred onto the first transfer belt 107, as shown in FIGS. 10B and 10C.

As shown in FIG. 8D, after the object 150 is transferred, the finger tip unit 105 is engaged with the engagement unit 702, whereby the object 150 can be conveyed by lifting.

Next, a third alternative example of the conveying process of the conveying apparatus 700 will be described with reference to FIG. 11.

Figure 11B:
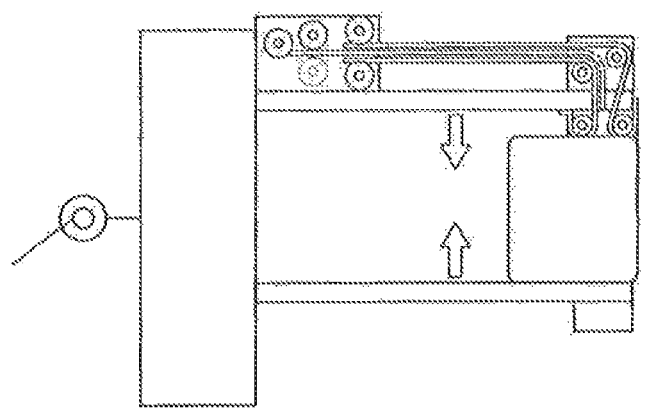
FIGS. 11A and 11D illustrate a third alternative example of the conveying process according to the second embodiment.
Figure 11A:
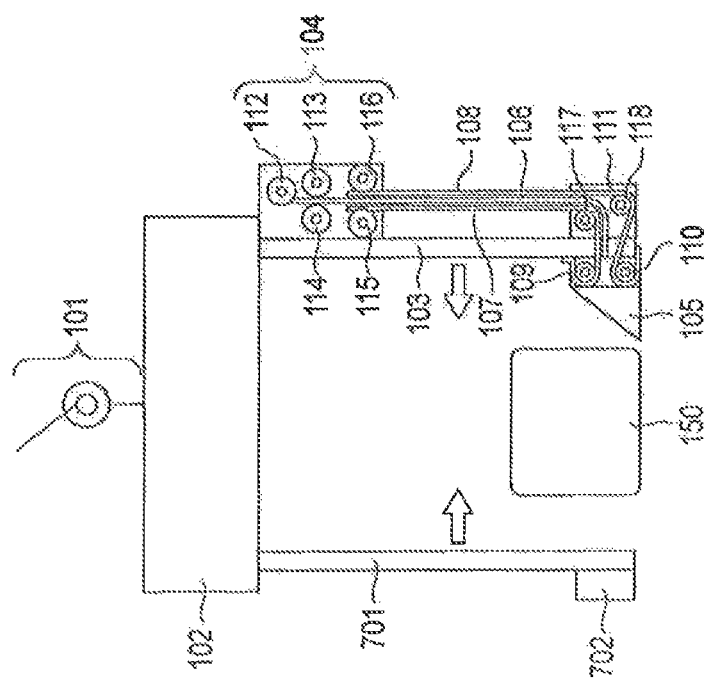

If the object 150 is a fixed-shaped object, and is resistant to pressing force, the object 150 can be conveyed by being held between the first support unit 103 and the second support unit 701, as shown in FIGS. 11A and 11B.

Assumed in the second embodiment is the case where the engagement unit 702 is provided on the second support unit 701; however, the engagement unit 702 may be provided on the first support unit 103. When the engagement unit 702 is provided on the first support unit 103, the finger unit is inserted under the object 150 and, after the object 150 is transferred onto the first transfer belt 107, is engaged with the engagement unit 702, whereby the object 150 can be gripped by being embraced by the drive belt 106.

According to the above-described second embodiment, the second support unit and the engagement unit allow the finger unit to be engaged with the engagement unit, and make it possible to transfer and convey a flexible object difficult to be held in a more stable state (Third Embodiment)

Described in the third embodiment is a case where the conveying apparatus includes a controller which controls an operation of the conveying apparatus in accordance with an operation instruction.

Figure 12:
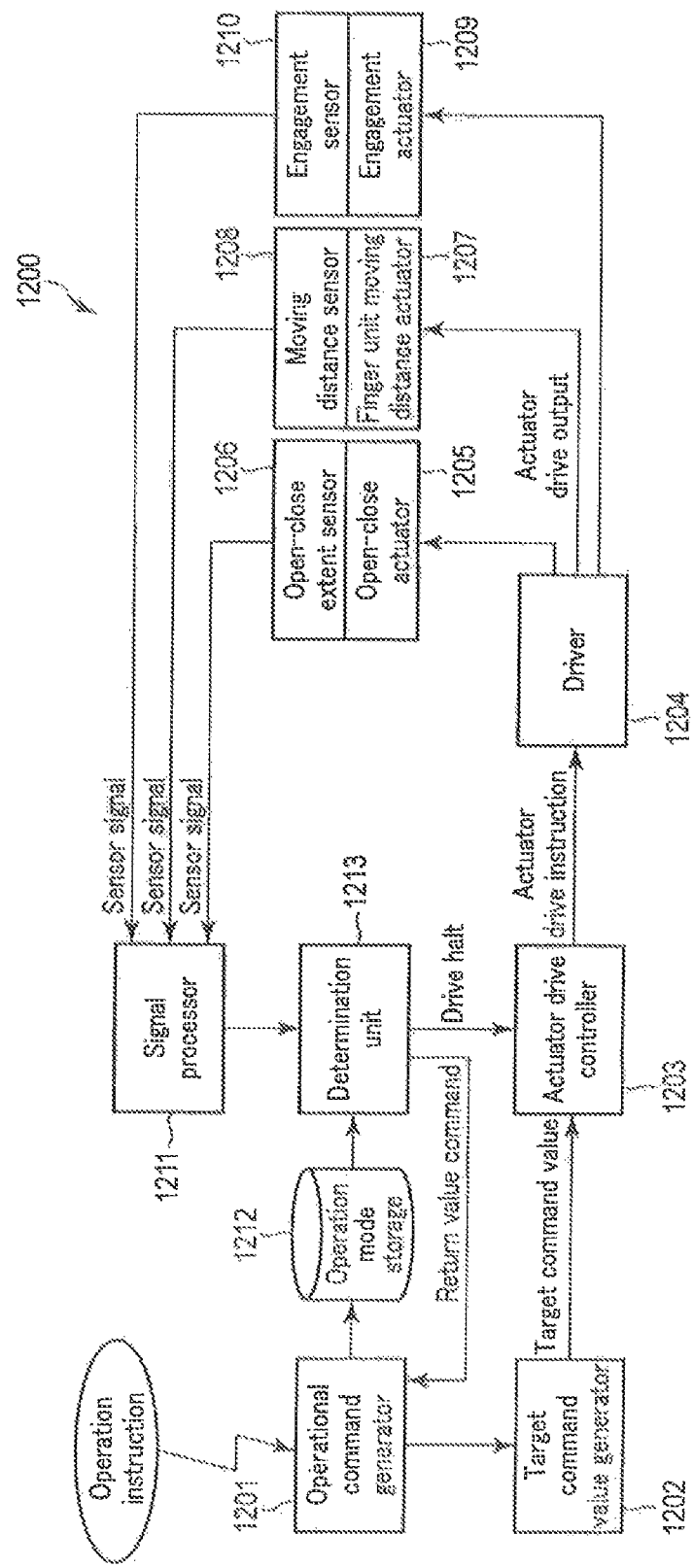
FIG. 12 is a block diagram illustrating a conveying apparatus according to a third embodiment.

The conveying apparatus according to the third embodiment will be described with reference to the block diagram of FIG. 12.

The conveying apparatus 1200 according to the third embodiment includes an operational command generator 1201, a target command value generator 1202, an actuator drive controller 1203, a driver 1204, an open-close actuator 1205, an open-close extent sensor 1206, a finger unit moving distance actuator 1207, a moving distance sensor 1208, an engagement actuator 1209, an engagement sensor 1210, a signal processor 1211, an operation mode storage 1212, and a determination unit 1213. The operational command generator 1201, the target command value generator 1202, the actuator drive controller 1203, the signal processor 1211, the operation mode storage 1212, and the determination unit 1213 are collectively called a controller.

The operational command generator 1201 divides an operation into operation steps necessary for operation processes in accordance with an operation instruction, and develops the operation steps into an instruction sequence at an operational command level for the open-close actuator 1205, the finger unit moving distance actuator 1207, and the engagement actuator 1209. The operational command generator 1201 sends operation mode information corresponding to the operational command to be executed to the determination unit 1213. The operation instruction relates to a series of operations of the conveying apparatus 1200 and is, for example, a form of a program. The operation instruction may be issued by a user touching, through an inputting device, an instruction command displayed on a panel of the inputting device. The input device may be integrated with the conveying apparatus as one body, or may he a device which can send an instruction to the conveying apparatus 1200 by wired network or wireless network.

The target command value generator 1202 receives, from the operational command generator 1201, an instruction sequence at the operational command level for each actuator. The target command value generator 1202 calculates a target trajectory and a target value for each of the open-close actuator 1205, the finger unit moving distance actuator 1207, and the engagement actuator 1209 in accordance with the instruction sequence, and generates a target instruction value for driving each actuator.

The actuator drive controller 1203 receives the target instruction value for each actuator, and generates an actuator drive instruction for driving each actuator in accordance with the target command value The driver 1204 receives en actuator drive instruction for each actuator from the actuator drive controller 1203, and generates an actuator drive output for each actuator.

The open-close actuator 1205 receives the actuator drive output from the driver 1204, operates the distance adjuster 102, and moves at least one of the first support unit 103 and the second support unit 701. The open-close actuator 1205 may be, for example, a combination of an electromagnetic rotating motor and a bell screw, or a combination of an electromagnetic rotating motor and a rack and pinion mechanism.

The open-close extent sensor 1206 senses the operation of the open-close actuator 1205, and generates a sensor signal. The sensor signal is, for example, a voltage value. As the open-close extent sensor 1206, for example, a potentiometer, an electrostatic capacitance-type sensor, a laser displacement meter, or an encoder may be used.

The finger unit moving distance actuator 1207 receives an actuator drive output from the driver 1204, operates the finger tip extension unit 104, and moves the finger unit back and forth by the drive belt 106.

The moving distance sensor 1208 senses the operation of the finger unit moving distance actuator 1207, and generates a sensor signal. The sensor signal is, for example, a voltage value. As the moving distance sensor 1208, for example, a potentiometer, an electrostatic capacitance type sensor, a laser displacement meter, a photosensor, an encoder or a pulse coder may be used. When the drive belt 106, the first transfer belt 107, and the second transfer belt 106 are wound about and energized at the drive belt winding unit 112, the first transfer belt winding unit 115 and the second transfer belt winding unit 116, respectively, a value obtained by measuring the diameter of each winding unit by a photosensor, for example, may be used as the sensor signal.

The engagement actuator 1209 receives an actuator drive output from the driver 1204, and adjusts the engagement operation between the engagement unit 702 and the finger tip unit 105.

The engagement sensor 1210 senses the operation of the engagement actuator 1209, and generates a sensor signal. The sensor signal is, for example, a voltage value. As the engagement actuator 1209, for example, a microswitch, a proximity sensor, a radio antenna, an RFID tag, a laser displacement meter, or a photosensor may be used.

The signal processor 1211 receives a sensor signal from each of the open-close extent sensor 1206, the moving distance sensor 1208, and the engagement sensor 1210, and performs signal processing, such as signal amplification processing, and analog-to-digital conversion processing on each sensor signal.

The operation mode storage 1212 stores actuator operations defined for each operation mode. The operation mode storage 1212 also stores attribute data such as a shape, weight, and flexibility of the object. For each operation mode, various operations, such as an operation of halting the operation of each actuator and an operation of holding a posture by maintaining a servo lock when conveying an object by lifting, are defined.

The determination unit 1213 receives converted sensor signals from the signal processor 1211, and determines whether or not adjustment of the distance, transfer of the object, and engagement of the finger unit have been completed in accordance with the converted sensor signals.

The determination unit 1213 also receives operation mode information from the operational command generator 1201 in accordance with the determination result, extracts an actuator operation corresponding to the operation mode corresponding to the operation mode information from the operation mode storage 1212, and generates a command of, for example, an actuator drive halt or servo lock.

Alternatively, the determination unit 1213 generates, for the operational command generator 1201, a return value command for correcting the target value. The return value command enables execution of a process suitable for the current operation, and thus enables drive control for securing reliability of the operation of the entire conveying apparatus.

Next, a conveying process of the conveying apparatus 1200 will be described with reference to the flowchart of FIG. 13. Assumed herein is the conveying processing shown in FIGS. 8A to 8D, 9A to 9D, and 10A to 10D.

In step S1301, the manipulator 101 moves the conveying apparatus 1200 to a position where an object can be transferred.

In step S1302, the distance adjuster 102 moves at least one of the first support unit 103 and the second support unit 701, and adjusts the distance. Specifically, the first support unit 103 and the second support unit 701 are directly driven by driving the open-close actuator 1205.

In step S1303, the determination unit 1213 determines whether or not the first support unit 103 and the second support unit 701 have reached desired positions. The determination is made based on, for example, whether or not the first support unit 103 and the second support unit 701 have reached predetermined position information by use of the sensor signal of the open-close extent sensor 1206. The position information may be a predetermined distance, positions visually confirmed by an external information collector such as a camera or a user, or information from contact sensors provided in the first support unit 103 and the second support unit 701. When the first support unit 103 and the second support unit 701 have reached the desired positions, the processing proceeds to step S1304. When the first support unit 103 and the second support unit 701 have not reached predetermined positions, the processing returns to step S1302, and the same steps are repeated.

In step S1304, the distance adjuster 102 halts movements of the first support unit 103 and the second support unit 701. Specifically, the actuator drive controller 1203 receives a command indicating a drive halt from the determination unit 1213, and halts the open-close actuator 1205 via the driver 1204.

In step S1305, the drive belt 106 moves the finger unit to go under the object. Specifically, the rotation drive part 113 is rotated by the finger unit moving distance actuator 1207, and the drive belt 106 moves in the direction of movement. In accordance with the movement, the finger unit moves, and the first transfer belt 107 and the second transfer belt 100 move in the direction of movement.

In step S1306, the determination unit 1213 determines whether or not the finger unit has been engaged with the engagement unit 702. The determination may be made based, on the sensor signal from the engagement sensor 1210. When the determination unit 1213 determines that the finger unit has been engaged with the engagement unit 702, the processing proceeds to step S1307. When the determination unit 1213 determines that the finger unit has not been engaged with the engagement unit 702, the processing returns to step S1305, and the same steps are repeated.

In step S1307, the finger unit moving distance actuator 1207 halts driving of the drive belt, Specifically, the actuator drive controller 1203 receives a command indicating a drive halt from the determination unit 1213, and halts the finger unit moving distance actuator 1207 via the driver 1204.

In step S1308, the manipulator 101 conveys the object transferred onto the first transfer belt 107. For example, the object can be lifted and held by moving the manipulator in the z-direction. This concludes the operation control of the conveying apparatus 1200.

In the third embodiment, assumed is the case where a central processing unit (CPU) realizes processing at the controller by program software in an external storage device, such as a memory; however, the processing may be realized by a single electronic circuit (hardware) without using the CPU.

According to the above-described third embodiment, the control operation enables transferring and conveying a flexible object difficult to be held, while securing reliability in operation of the entire conveying apparatus.

In the second embodiment and the third embodiment, use of two support units, that is, the first support unit 103 and the second support unit 701 is assumed. However, the number of support units may be increased to, for example, four or six, in consideration of stability during transfer of the object. For example, when there are four support units, the first support unit from which the finger unit moves is paired with the second support unit opposed to the first support unit and having the engagement unit, and two pairs may be disposed at the vertexes of a rectangle at every 90 degrees so that the first support unit and the second support unit are alternatively provided.

In the above embodiments, the first transfer belt winding unit 115 and the second transfer belt winding unit 116 are provided in the finger tip extension unit 104.

However, the first transfer belt winding unit 115 and the second transfer belt winding unit 116 may be at the positions of the first finger rotation roller 109 and the second finger rotation roller 110 of the finger unit, Specifically, one end of the first transfer belt 107 is fixed to the first support unit 103, and the other end of the first transfer belt 107 is wound about and energized by the first transfer belt winding unit 115 in the finger unit. Similarly, one end of the second transfer belt 108 is fixed to the first support unit 103, and the other end of the second transfer belt 108 is wound about and energized by the second transfer belt winding unit 115 in the finger unit.

Accordingly, as in the above-described embodiments, the first transfer belt 107 and the second transfer belt 108 can be moved together with the drive belt 106.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A conveying apparatus, comprising:
   a first support unit;
   a finger unit that includes a first rotation unit and a second rotation unit;
   a drive belt that includes one end fixed to the finger unit and moves the finger unit in a direction of movement;
   a first transfer belt that is provided on a first surface of the drive belt and includes one end folded at the first rotation unit to be away from the first surface and fixed to the first support unit; and
   a second transfer belt that is provided on a second surface of the drive belt opposed to the first surface and includes one end folded at the second rotation unit to be away from the second surface and fixed to the first support unit,
   wherein the first transfer belt and the second transfer belt move together with the drive belt when the drive belt moves in the direction.

2. The apparatus according to claim 1, wherein an object to be conveyed is transferred onto the first transfer belt by the finger unit going under the object or into the object while accompanying the drive belt.

3. The apparatus according to claim 1, further comprising an engagement unit that is arranged at the first support unit and engaged with the finger unit, wherein the finger unit is engaged with the engagement unit after an object to be conveyed is transferred onto the first transfer belt.

4. The apparatus of claim 3, further comprising:
   a sensor that generates a sensor signal for detecting engagement between the finger unit and the engagement unit; and
   a controller that halts driving of the drive belt in accordance with the sensor signal.

5. The apparatus according to claim 3, wherein at least a part of the finger unit is made of iron, and the engagement unit is an electromagnet.

6. The apparatus according to claim 1, further comprising:
   a second support unit that is opposed to the first support unit; and
   an engagement unit that is provided on the second support unit and engaged with the finger unit
   after an object to be conveyed is transferred onto the first transfer belt.

7. The apparatus according to claim 1, wherein the finger unit includes a suction mechanism.

8. The apparatus according to claim 1, wherein another end of each of the drive belt, the first transfer belt and the second transfer belt is wound and energized to make torque work in a direction of rewinding the drive belt, the first transfer belt and the second transfer belt.

9. The apparatus according to claim 1, wherein the direction of movement is a direction that the finger unit moves.

\* \* \* \* \*